United States Patent
Kimura

(10) Patent No.: US 10,917,772 B2
(45) Date of Patent: Feb. 9, 2021

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Tsutomu Kimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/734,416

(22) Filed: Jan. 6, 2020

(65) Prior Publication Data

US 2021/0014657 A1  Jan. 14, 2021

(30) Foreign Application Priority Data

Jul. 8, 2019 (JP) ................. 2019-126694

(51) Int. Cl.
| | |
|---|---|
| *H04W 4/80* | (2018.01) |
| *H04W 88/06* | (2009.01) |
| *H04W 88/04* | (2009.01) |
| *H04W 4/02* | (2018.01) |
| *H04L 29/08* | (2006.01) |
| *H04M 1/725* | (2021.01) |

(52) U.S. Cl.
CPC ......... *H04W 4/80* (2018.02); *H04L 29/08072* (2013.01); *H04M 1/7253* (2013.01); *H04W 4/023* (2013.01); *H04W 88/04* (2013.01); *H04W 88/06* (2013.01); *H04N 2201/006* (2013.01)

(58) Field of Classification Search
CPC ....... H04W 4/80; H04W 4/023; H04W 88/06; H04L 29/08072; H04M 1/7253
See application file for complete search history.

(56) References Cited

U.S. PATENT DOCUMENTS

| | | | |
|---|---|---|---|
| 2014/0177510 A1* | 6/2014 | Tajima | H04L 12/1881 370/312 |
| 2015/0271755 A1* | 9/2015 | Karri | H04W 28/0221 370/252 |
| 2016/0057803 A1* | 2/2016 | Kim | H04W 52/0209 370/329 |
| 2016/0192258 A1* | 6/2016 | Ciullo | H04W 52/028 370/331 |
| 2016/0306554 A1* | 10/2016 | Li | G06F 3/0653 |
| 2018/0343618 A1* | 11/2018 | Park | H04W 52/0245 |

FOREIGN PATENT DOCUMENTS

| | | |
|---|---|---|
| JP | 2005-072633 | 3/2005 |
| JP | 2019024758 | 2/2019 |

* cited by examiner

*Primary Examiner* — Md K Talukder
(74) *Attorney, Agent, or Firm* — JCIPRNET

(57) ABSTRACT

An information processing apparatus includes a first communication unit that performs first wireless communication, which is long-distance wireless communication with a terminal, a second communication unit that performs second wireless communication, which is short-distance wireless communication with the terminal, and a control unit that, if notified from the terminal that an amount of information accumulated in the terminal is equal to or larger than a predetermined threshold, switches from the first communication unit to the second communication unit.

11 Claims, 11 Drawing Sheets

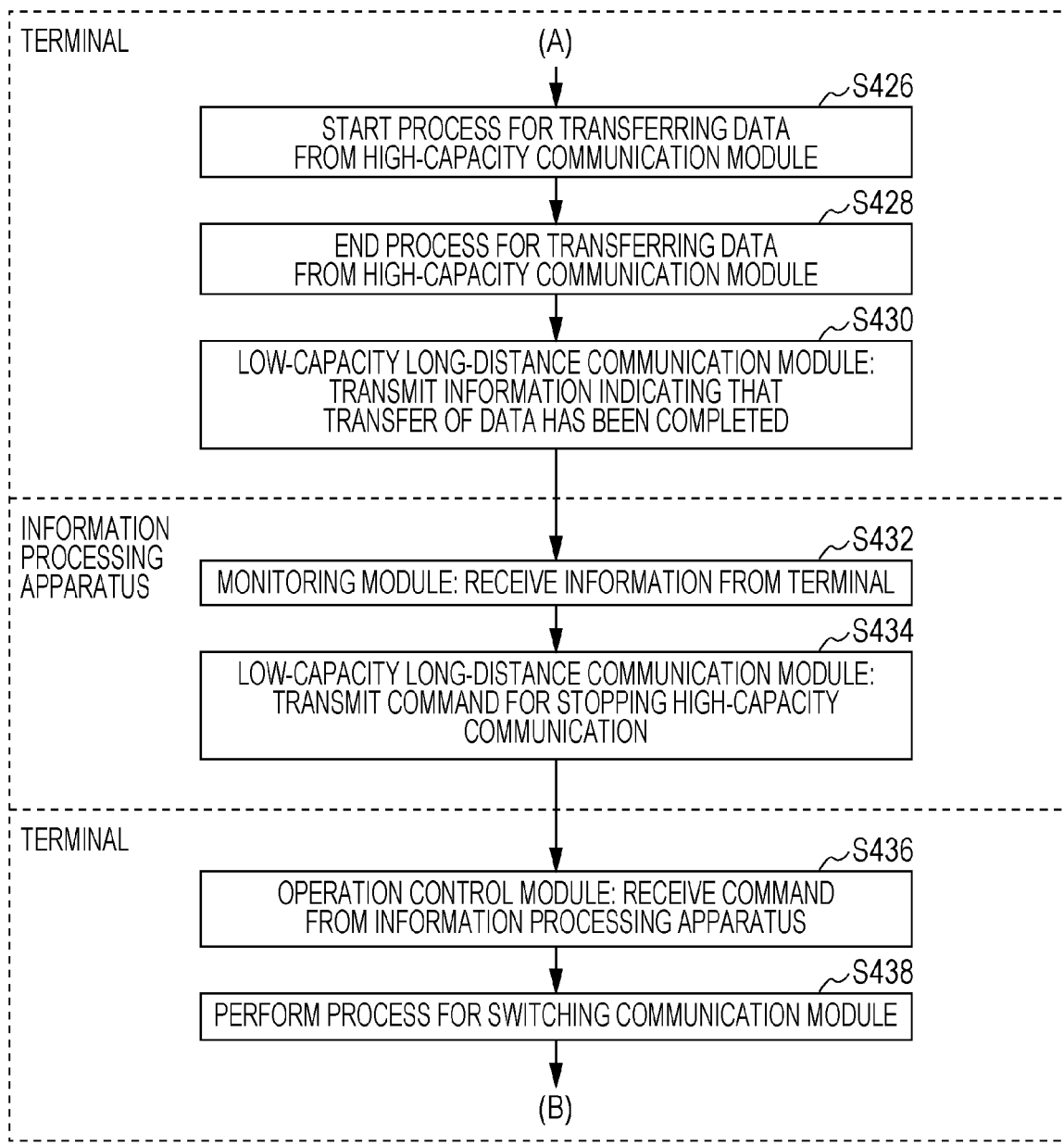

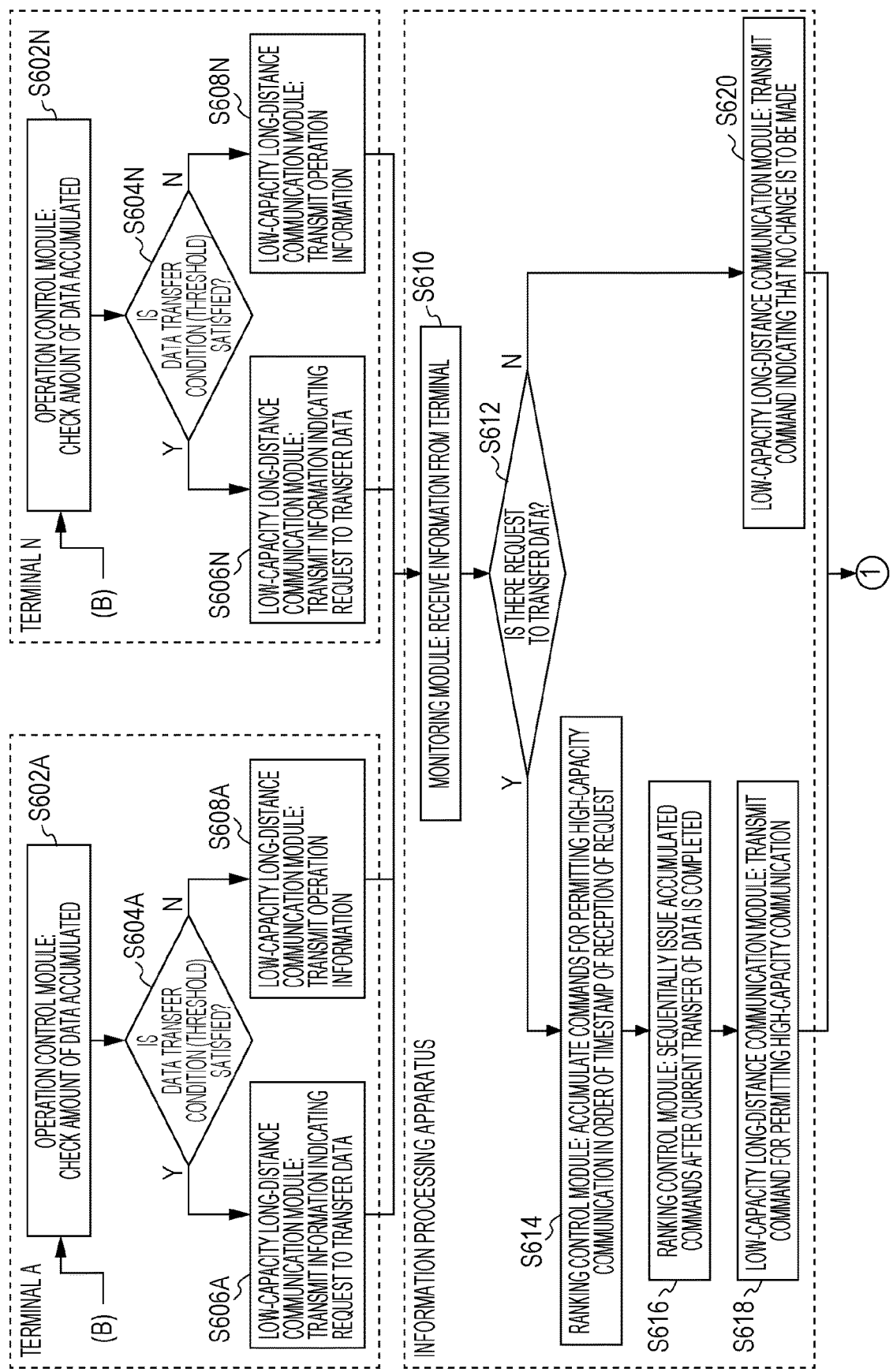

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-126694 filed Jul. 8, 2019.

BACKGROUND

(i) Technical Field

The present disclosure relates to an information processing apparatus and a non-transitory computer readable medium.

(ii) Related Art

Japanese Unexamined Patent Application Publication No. 2005-072633 discloses, in view of popularization of Bluetooth-compatible devices, voice over Internet protocol (VoIP), and constant Internet connection, means for achieving communication with a Bluetooth-compatible mobile phone that employs a Bluetooth-compatible device as a relay, and aims to achieve cost-efficient communication means using the disclosed means. A mobile wireless communication terminal having a long-distance wireless communication function and a short-distance wireless communication function regularly searches for a device capable of performing communication achieved by short-distance wireless communication means and including means for communicating with the outside. If finding such a device, the mobile wireless communication terminal transmits, to a server that manages the terminal, information necessary to connect the device as a relay in order to achieve the communication.

SUMMARY

When an information processing apparatus that communicates with a terminal can perform first wireless communication, which is long-distance wireless communication, and second wireless communication, which is short-distance wireless communication, and selects either the first wireless communication or the second wireless communication in a uniform manner, interference might occur in the selected wireless communication.

Aspects of non-limiting embodiments of the present disclosure relate to an information processing apparatus including first communication means that performs first wireless communication, which is long-distance wireless communication with a terminal, and second wireless communication, which is short-distance wireless communication with the terminal, and a non-transitory computer readable medium. The information processing apparatus and the non-transitory computer readable medium are capable of reducing interference in wireless communication compared to when either the first wireless communication or the second wireless communication is selected in a uniform manner.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a first communication unit that performs first wireless communication, which is long-distance wireless communication with a terminal, a second communication unit that performs second wireless communication, which is short-distance wireless communication with the terminal, and a control unit that, if notified from the terminal that an amount of information accumulated in the terminal is equal to or larger than a predetermined threshold, switches from the first communication unit to the second communication unit.

BRIEF DESCRIPTION OF THE DRAWINGS

Exemplary embodiments of the present disclosure will be described in detail based on the following figures, wherein:

FIGS. 4A and 4B are flowcharts illustrating an example of a process according to the first exemplary embodiment;

FIGS. 6A and 6B are flowcharts illustrating an example of a process according to the second exemplary embodiment;

DETAILED DESCRIPTION

Exemplary embodiments of the present disclosure will be described hereinafter with reference to the drawings.

First Exemplary Embodiment

Figure 1:
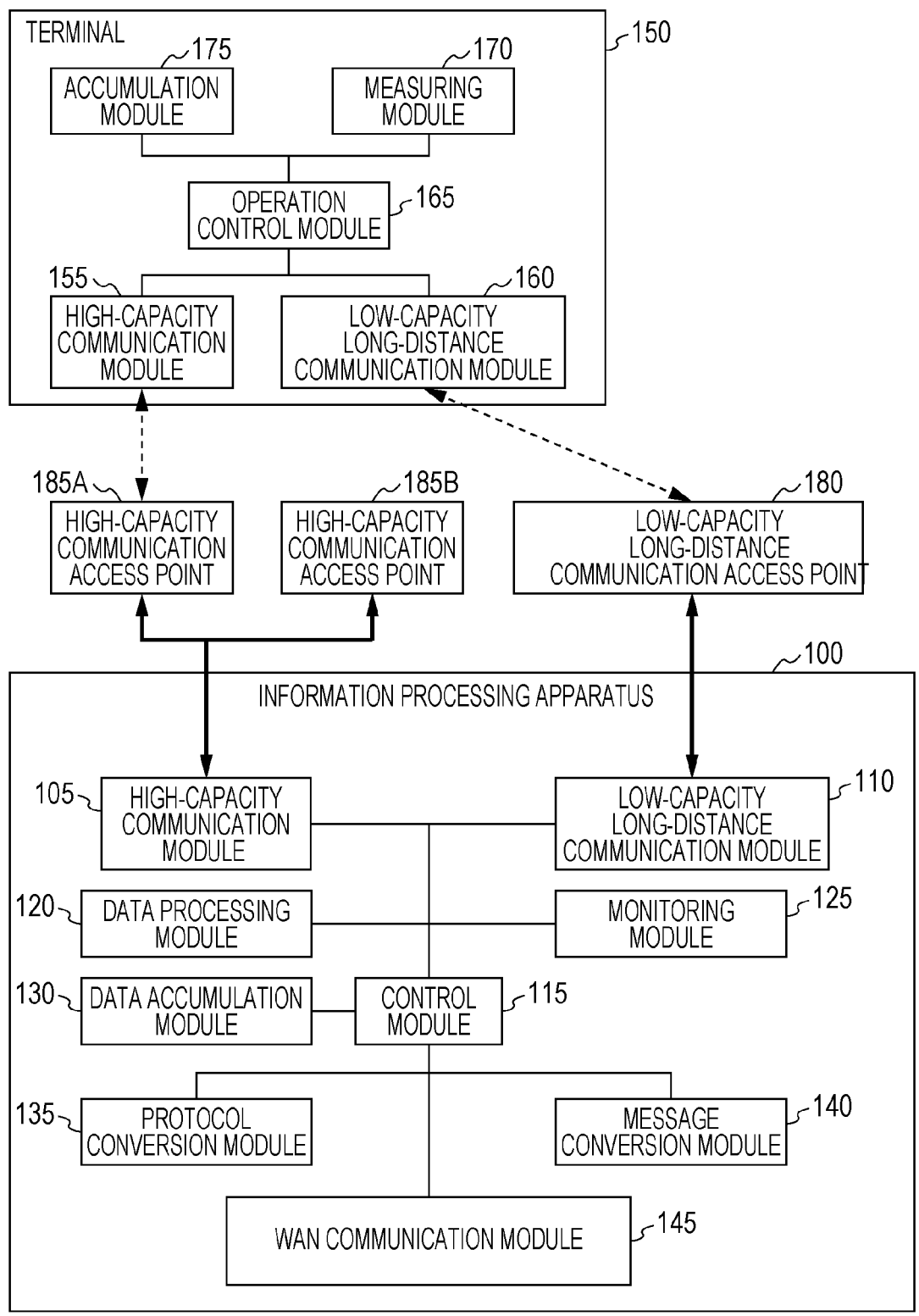
FIG. 1 is a conceptual diagram illustrating an example of the configuration of modules according to a first exemplary embodiment.

FIG. 1 is a conceptual diagram illustrating an example of the configuration of modules according to a first exemplary embodiment.

A term "modules" generally refers to software (includes computer programs) or hardware components logically separable from one another. That is, the modules in the present exemplary embodiment may be not only modules achieved by a computer program but also modules included in a hardware configuration. The present exemplary embodiment therefore also applies to a computer program (e.g., a program for causing a computer to perform steps, a program for causing a computer to function as means, or a program for causing a computer to achieve functions), a system, and a method for achieving these modules. Although "store", "stored", and other equivalent terms will be used for convenience of description, these terms mean, when an exemplary embodiment is a computer program, that the computer program is stored in a storage device or the storage device is controlled in such a way as to store the computer program. The modules may be in one-to-one correspondence with functions, but in practice, one module may be achieved by one program, a plurality of modules may be achieved by one program, or one module may be achieved by a plurality of programs. A plurality of modules may be executed by one computer, or one module may be executed by a plurality of computers in distributed or parallel computing. One module may include another module. In the following description, a term "connection" will be used not only for a physical connection but also for a logical connection (e.g., communication of data, issuance of instructions, reference relationships of data, login, etc.). A term "predetermined" will be used when something is determined prior to a target process. The term "predetermined" will be used not only when something is determined prior to a process according to the present exemplary embodiment but also when something is determined prior to a target step in accordance with a situation or a state at the time or a situation or a state so far, even if a process according to the present exemplary embodiment has already started. When there are a plurality of predetermined values, the values may be different from one another or two or more of the values (or all the values, obviously) may be the same. A sentence "If something is A, B is performed" means that it is determined whether something is A, and if so, B is performed. This, however, excludes a case where the determination whether something is A need not be made. In addition, when items are enumerated like "A, B, and C", these items are enumerated as examples unless otherwise specified, and it is possible that only one of the items (e.g., only A) is selected.

A system or an apparatus may be achieved by a plurality of computers, a plurality of pieces of hardware, a plurality of apparatuses, or the like connected to one another through communication means such as a network (includes a one-to-one connection) or may be achieved by a single computer, a single piece of hardware, a single apparatus, or the like. Terms "apparatus" and "system" will be used as synonyms. Needless to say, the term "system" does not imply a social mechanism (social system), which is based on a human agreement.

Target information is read from a storage device before a process or each of a plurality of processes performed by a module, and a result of the process is written to the storage device after the process is completed. Description of the reading of information from the storage device before a process and the writing of a result to the storage device after a process, therefore, might be omitted. The storage device herein may be a hard disk, a random-access memory (RAM), an external storage medium, a storage device at another end of a communication link, a register in a central processing unit (CPU), or the like.

An information processing apparatus 100 according to the first exemplary embodiment has a function of communicating with at least one terminal 150 and includes, as illustrated in the example illustrated in FIG. 1, a high-capacity communication module 105, a low-capacity long-distance communication module 110, a control module 115, a data processing module 120, a monitoring module 125, a data accumulation module 130, a protocol conversion module 135, a message conversion module 140, and a wide area network (WAN) communication module 145.

The information processing apparatus 100 is capable of performing a plurality of types of wireless communication and switches between the plurality of types of wireless communication. The information processing apparatus 100 has a function as a so-called "gateway apparatus". The information processing apparatus 100 wirelessly communicates with the at least one terminal 150. The wireless communication between the information processing apparatus 100 and the terminal 150 is performed through a low-capacity long-distance communication access point 180 or a high-capacity communication access point 185. When the low-capacity long-distance communication access point 180 is used, first wireless communication is performed, and when the high-capacity communication access point 185 is used, second wireless communication is performed.

The low-capacity long-distance communication module 110 is connected to the control module 115 and the low-capacity long-distance communication access point 180. The low-capacity long-distance communication module 110 performs the first wireless communication, which is long-distance wireless communication with the terminal 150.

Furthermore, in the first wireless communication, power consumption may be lower than in the second wireless communication.

The first wireless communication is, for example, low-power wide-area (LPWA). In LPWA, long-distance wireless communication can be performed with low power consumption. The "long-distance wireless communication" refers to wireless communication over, say, 1 km or more. More specifically, LoRaWAN (registered trademark), Sigfox (registered trademark), Wi-SUN (registered trademark), LTE Cat. 1, LTE Cat. M1, narrowband Internet of things (NB-IoT), or the like may be used.

Since the first wireless communication can be performed with low power consumption, the first wireless communication is normally used to communicate with the terminal 150. The first wireless communication, however, has low capacity. "Low capacity" may be defined by low communication speed. The first wireless communication is therefore not suitable for transmission of a large amount of data. That is, if the amount of information accumulated in an accumulation module 175 of the terminal 150 becomes equal to or larger than a predetermined threshold, the second wireless communication, which will be described hereinafter, is more suitable than the first wireless communication.

The high-capacity communication module 105 is connected to the control module 115, a high-capacity communication access point 185A, and a high-capacity communication access point 185B. The high-capacity communication module 105 performs the second wireless communication, which is short-distance wireless communication with the terminal 150. The "short distance" may be a distance relative to a communication distance that can be achieved by the first wireless communication.

Furthermore, in the second wireless communication, communication capacity may be higher than in the first wireless communication. In this case, since communication capacity is higher in the second wireless communication than in the first wireless communication, the second wireless communication is performed when the amount of information accumulated in the terminal 150 is equal to or larger than the predetermined threshold. The second wireless communication may be defined by a communication speed thereof higher than that of the first wireless communication.

The second wireless communication may also be defined by a cost thereof lower than that of the first wireless communication. This includes a case where the second wireless communication is free of charge. The first wireless communication may be communication generally managed by a telecommunications company.

The second wireless communication is, for example, Wi-Fi or Bluetooth (registered trademark).

The control module 115 is connected to the high-capacity communication module 105, the low-capacity long-distance communication module 110, the data processing module 120, the monitoring module 125, the data accumulation module 130, the protocol conversion module 135, the message conversion module 140, and the WAN communication module 145. The control module 115 controls the modules of the information processing apparatus 100.

If the control module 115 is notified from the terminal 150 that the amount of information accumulated in the terminal 150 is equal to or larger than the predetermined threshold, the control module 115 switches from the low-capacity long-distance communication module 110 to the high-capacity communication module 105.

In this case, the control module 115 may transmit, to the terminal 150, an instruction to switch from the first wireless communication to the second wireless communication. The control module 115 may transmit the instruction to the terminal 150 through the first wireless communication achieved by the low-capacity long-distance communication module 110 or the second wireless communication achieved by the high-capacity communication module 105. For example, the control module 115 may transmit the instruction through wireless communication that has been used (the first wireless communication in this case) or a predetermined type of wireless communication.

If the control module 115 is notified from the terminal 150 that transmission of information accumulated in the terminal 150 has been completed, the control module 115 may switch from the high-capacity communication module 105 to the low-capacity long-distance communication module 110. That is, the control module 115 may resume the first wireless communication, which is a default type of wireless communication.

In this case, the control module 115 may transmit, to the terminal 150, an instruction to switch from the second wireless communication to the first wireless communication. The control module 115 may transmit the instruction to the terminal 150 through the second wireless communication achieved by the high-capacity communication module 105 or the first wireless communication achieved by the low-capacity long-distance communication module 110. For example, the control module 115 may transmit the instruction through wireless communication that has been used (the second wireless communication in this case) or a predetermined type of wireless communication.

The data processing module 120 is connected to the control module 115. The data processing module 120 processes data received from the terminal 150. If data received from the terminal 150 is biological information such as brain waves of a user, for example, the data processing module 120 may estimate a state of the user, such as concentrating or relaxed, using the biological information.

The monitoring module 125 is connected to the control module 115. The monitoring module 125 monitors a state of the terminal 150. For example, the monitoring module 125 may monitor the amount of information accumulated in the accumulation module 175 of the terminal 150.

The data accumulation module 130 is connected to the control module 115. The data accumulation module 130 accumulates data received from the terminal 150. A device used to accumulate data may be, for example, a hard disk, a solid-state driver (SSD), or the like.

The protocol conversion module 135 is connected to the control module 115. The protocol conversion module 135 converts a communication protocol when the first wireless communication or the second wireless communication is performed with the terminal 150.

The message conversion module 140 is connected to the control module 115. The message conversion module 140 converts messages when the first wireless communication or the second wireless communication is performed with the terminal 150.

The WAN communication module 145 is connected to the control module 115. The WAN communication module 145 transmits, to another information processing apparatus, data obtained from the terminal 150 and data processed by the information processing apparatus 100 through a WAN. The WAN communication module 145 also transfers, to the control module 115 or the terminal 150, data, instructions, and the like obtained from another information processing apparatus.

The terminal 150 includes a high-capacity communication module 155, a low-capacity long-distance communication module 160, an operation control module 165, a measuring module 170, and an accumulation module 175. The terminal 150 may be, for example, a device called an "Internet of things (IoT) device". The terminal 150 transmits a result of measurement performed by the measuring module 170.

The terminal 150 normally performs the first wireless communication with the information processing apparatus 100 using the low-capacity long-distance communication module 160. The terminal 150 also performs the second wireless communication with the information processing apparatus 100 using the high-capacity communication module 155 while switching from the low-capacity long-distance communication module 160, which is used in the first wireless communication, to the high-capacity communication module 155 in accordance with an instruction from the information processing apparatus 100. The instruction from the information processing apparatus 100 is given if the information processing apparatus 100 is notified that the amount of information accumulated in the accumulation module 175 has become equal to or larger than the predetermined threshold.

The terminal 150 then performs the first wireless communication with the information processing apparatus 100 using the low-capacity long-distance communication module 160 while switching from the high-capacity communication module 155, which is used in the second wireless communication, to the low-capacity long-distance communication module 160 in accordance with an instruction from the information processing apparatus 100. The instruction from the information processing apparatus 100 is given if the information processing apparatus 100 is notified that transmission of information accumulated in the accumulation module 175 has been completed.

The high-capacity communication module 155 is connected to the operation control module 165 and the high-capacity communication access point 185A. The high-capacity communication module 155 performs the second wireless communication, which is short-distance wireless communication with the information processing apparatus 100.

The low-capacity long-distance communication module 160 is connected to the operation control module 165 and the low-capacity long-distance communication access point 180. The low-capacity long-distance communication module 160 performs the first wireless communication, which is long-distance wireless communication with the information processing apparatus 100.

The operation control module 165 is connected to the high-capacity communication module 155, the low-capacity long-distance communication module 160, the measuring module 170, and the accumulation module 175. The operation control module 165 controls the other modules of the terminal 150.

The operation control module 165 notifies the information processing apparatus 100 of a result of a determination whether the amount of information accumulated in the accumulation module 175 is equal to or larger than the predetermined threshold. The operation control module 165 may notify the information processing apparatus 100 through the second wireless communication achieved by the high-capacity communication module 155 or the first wireless communication achieved by the low-capacity long-distance communication module 160. For example, the operation control module 165 may notify the information processing apparatus 100 through wireless communication that has been used (the first wireless communication in this case) or a predetermined type of wireless communication. The operation control module 165 of the terminal 150 makes the determination in order to enable each of the at least terminal 150 to manage its own threshold. That is, if the information processing apparatus 100 was configured to make the determination, the information processing apparatus 100 would need to manage a threshold of each of the at least one terminal 150. More specifically, the information processing apparatus 100 would need to manage thresholds of not only various types of terminals 150 but also new terminals 150, which is unrealistic.

The measuring module 170 is connected to the operation control module 165. The measuring module 170 is a sensor and accumulates results of measurement in the accumulation module 175. As an example of the measuring module 170, a sensor that measures biological information regarding a user will be described later with reference to FIG. 3.

The accumulation module 175 is connected to the operation control module 165. The accumulation module 175 accumulates data measured by the measuring module 170. The accumulated data is transmitted to the information processing apparatus 100 by the high-capacity communication module 155 or the low-capacity long-distance communication module 160.

The low-capacity long-distance communication access point 180 is connected to the low-capacity long-distance communication module 110 of the information processing apparatus 100 and the low-capacity long-distance communication module 160 of the terminal 150. The low-capacity long-distance communication access point 180 connects the information processing apparatus 100 and the terminal 150 to each other through the first wireless communication.

A high-capacity communication access point 185 is connected to the high-capacity communication module 105 of the information processing apparatus 100 and the high-capacity communication module 155 of the terminal 150. The high-capacity communication access point 185 connects the information processing apparatus 100 and the terminal 150 to each other through the second wireless communication.

In the example illustrated in FIG. 1, only the high-capacity communication access point 185A connects the information processing apparatus 100 and the terminal 150 to each other through the second wireless communication. Another high-capacity communication access point 185 (the high-capacity communication access point 185B in the example illustrated in FIG. 1), however, may connect the information processing apparatus 100 and another terminal 150 to each other through the second wireless communication.

Figure 2:
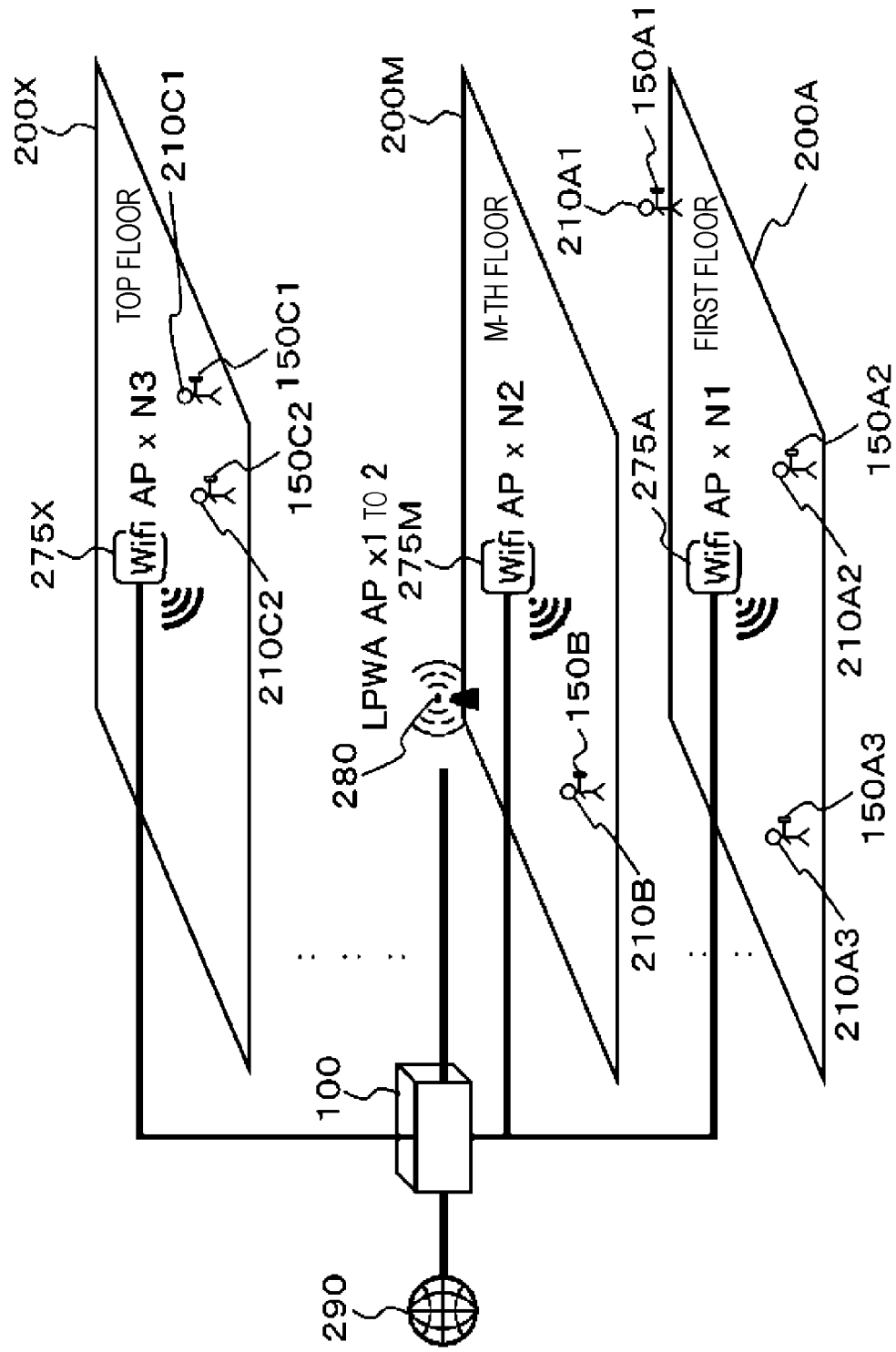
FIG. 2 is a diagram illustrating an example of a system configuration according to the first exemplary embodiment.

FIG. 2 is a diagram illustrating an example of a system configuration according to the first exemplary embodiment.

FIG. 2 illustrates an example in which the information processing apparatus 100 collects biological information and the like regarding users 210 from terminals 150 worn by the users 210 in an office building and then transmits the biological information and the like to information processing apparatuses (include apparatuses that perform cloud computing) connected to the Internet 290. In this example, the information processing apparatus 100 has a function of an IoT hub.

N1 Wi-Fi access points 275A are installed on a first floor 200A, and there are three users 210 (user 210A1, 210A2, and 210A3 who wear terminals 150A1, 150A2, and 150A3, respectively). N2 Wi-Fi access points 275M and one or two LPWA access points 280 are installed on an M-th floor 200M, and there is one user 210 (a user 210B who wears a terminal 150B). N3 Wi-Fi access points 275X are installed on a top floor 200X, and there are two users 210 (users 210C1 and 210C2 who wear terminals 150C1 and 150C2, respectively). The Wi-Fi access points 275 are examples of the high-capacity communication access point 185. The LPWA access points 280 are examples of the low-capacity long-distance communication access point 180.

In a communication environment of the office building, a network (e.g., Wi-Fi) intended for communication of document information, numerical information regarding business management, and the like is provided over a wide area.

In utilization of IoT devices according to the fourth industrial revolution and digital transformation (data acquisition by sensors included in the IoT devices), IoT devices are incorporated into apparatuses installed in manufacturing sites, factories, and the like, and wireless networks are used to transmit data from the IoT devices. In the future, IoT devices will be used at places where people work, such as office buildings. That is, more and more IoT devices will measure information regarding people. Biological information, behavioral information, activity information, and the like will therefore be obtained from workers, and these pieces of information will be transmitted to existing networks.

Because the amount of data of information measured from people greatly varies depending on how densely people gather, the amount of communication traffic in a network might become large, and communication speed might decrease. In this case, operations employing the network might be affected.

In the technique described in Japanese Unexamined Patent Application Publication No. 2005-072633, therefore, another communication means (network) is provided. Although two different communication means are used, the selected communication means are cheap. Radio waves in 2.4 MHz band and the like, therefore, can interfere with one another if mesh networking is employed using Wi-Fi networks or networks based on short-distance wireless communication (Bluetooth, etc.).

In the present exemplary embodiment, the second wireless communication, which is high-capacity communication means, and the first wireless communication, which is low-capacity long-distance communication means, are used. The second wireless communication is, for example, Wi-Fi. The Wi-Fi access points 275 are characterized by short-distance communication, high power consumption, and high data transfer capacity, for example, and a large number of Wi-Fi access points 275 need to be provided in order to cover an area. The first wireless communication, on the other hand, is, for example, LPWA. The LPWA access points 280 are characterized by long-distance communication, low power consumption, and low data transfer capacity, for example, and one or two LPWA access points 280 are enough to cover the area in the example illustrated in FIG. 2.

LoRa, which is one of LPWA communication techniques, has a communication distance of about 15 km outdoor. The present inventor conducted an experiment for examining the indoor communication capacity of LoRa. As a result, it was confirmed that communication could be performed over at least 12 floors above and below a reference floor, on which an LPWA access point 280 is provided.

In this example, therefore, one or two LPWA access points 280 are provided on the M-th floor 200M, which is an intermediate floor of the office building, and receive data transmitted from the terminals 150 on all floors. The Wi-Fi access points 275, on the other hand, are provided on each floor and receive data transmitted from terminals 150 on the same floor (more accurately, terminals 150 located within communication ranges of the Wi-Fi access points 275).

In the present exemplary embodiment, the first wireless communication is normally performed between the terminal 150 and the information processing apparatus 100. The operation control module 165 of the terminal 150 and the control module 115 of the information processing apparatus 100 monitor an operation state of the terminal 150, and if the amount of data accumulated in the terminal 150 becomes equal to or larger than the threshold, communication control is performed such that the terminal 150 transmits data to the information processing apparatus 100 through the second wireless communication.

Figure 3A:
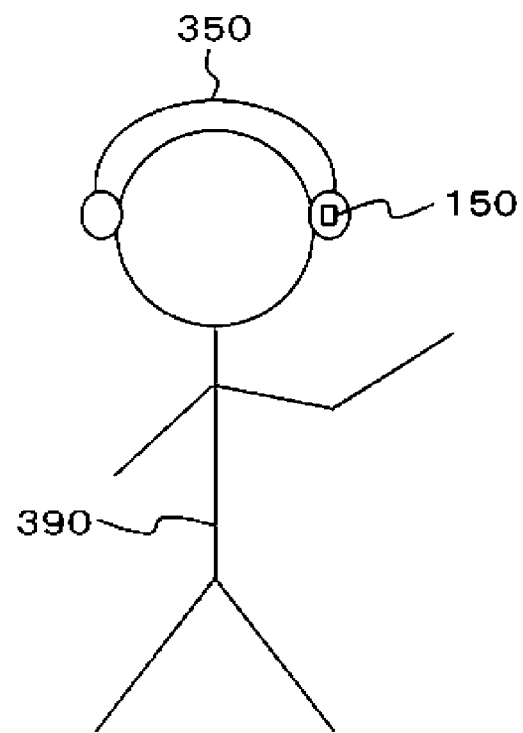
FIGS. 3A and 3B are diagrams illustrating examples of the configuration of a terminal.
Figure 3B:
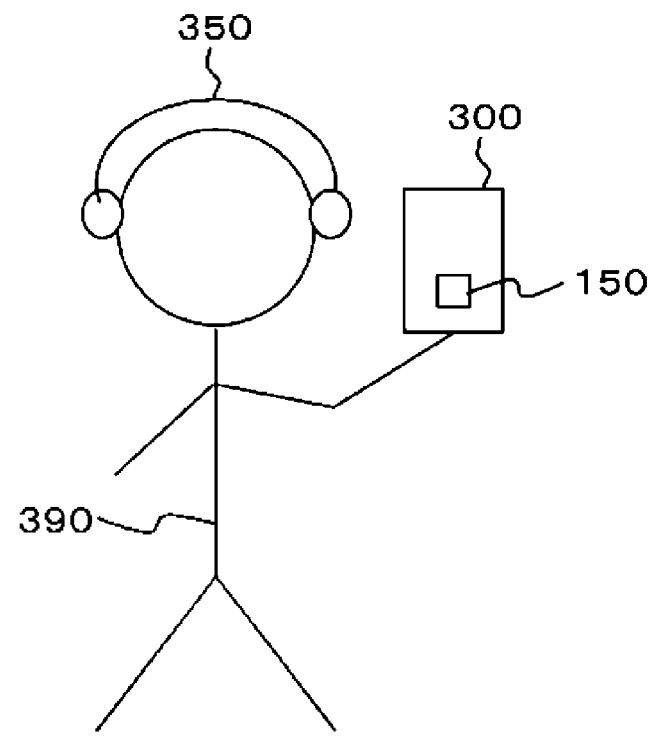

FIGS. 3A and 3B are diagrams illustrating examples of the configuration of the terminal 150.

FIG. 3A illustrates an example in which the terminal 150 is incorporated into a wearable device 350.

The wearable device 350 is attached, for example, to a head of a user 390. The wearable device 350 measures potential at the head of the user 390. An electrode described in Japanese Unexamined Patent Application Publication No. 2019-024758 (an electrode that is composed of a foam material, conductive at least in a portion in contact with a living body, and detects brain waves from the living body), for example, may be used.

The wearable device 350 then transmits a potential measurement result, which is a result of the measurement, to the information processing apparatus 100 through the LPWA access point 280 or the Wi-Fi access point 275.

FIG. 3B illustrates an example in which the terminal 150 is incorporated into a smartphone 300.

The wearable device 350 is attached, for example, to the head of the user 390. The user 390 carries the smartphone 300. The smartphone 300 and the wearable device 350 can communicate with each other wirelessly or by wire. Bluetooth, for example, may be used. The terminal 150 obtains a potential measurement result obtained by the wearable device 350 at the head of the user 390 and results of measurement performed by sensors included in the smartphone 300 (e.g., an acceleration sensor, a camera, and a brightness sensor) and transmits the results to the information processing apparatus 100 through the LPWA access point 280 or the Wi-Fi access point 275.

Figure 4A:
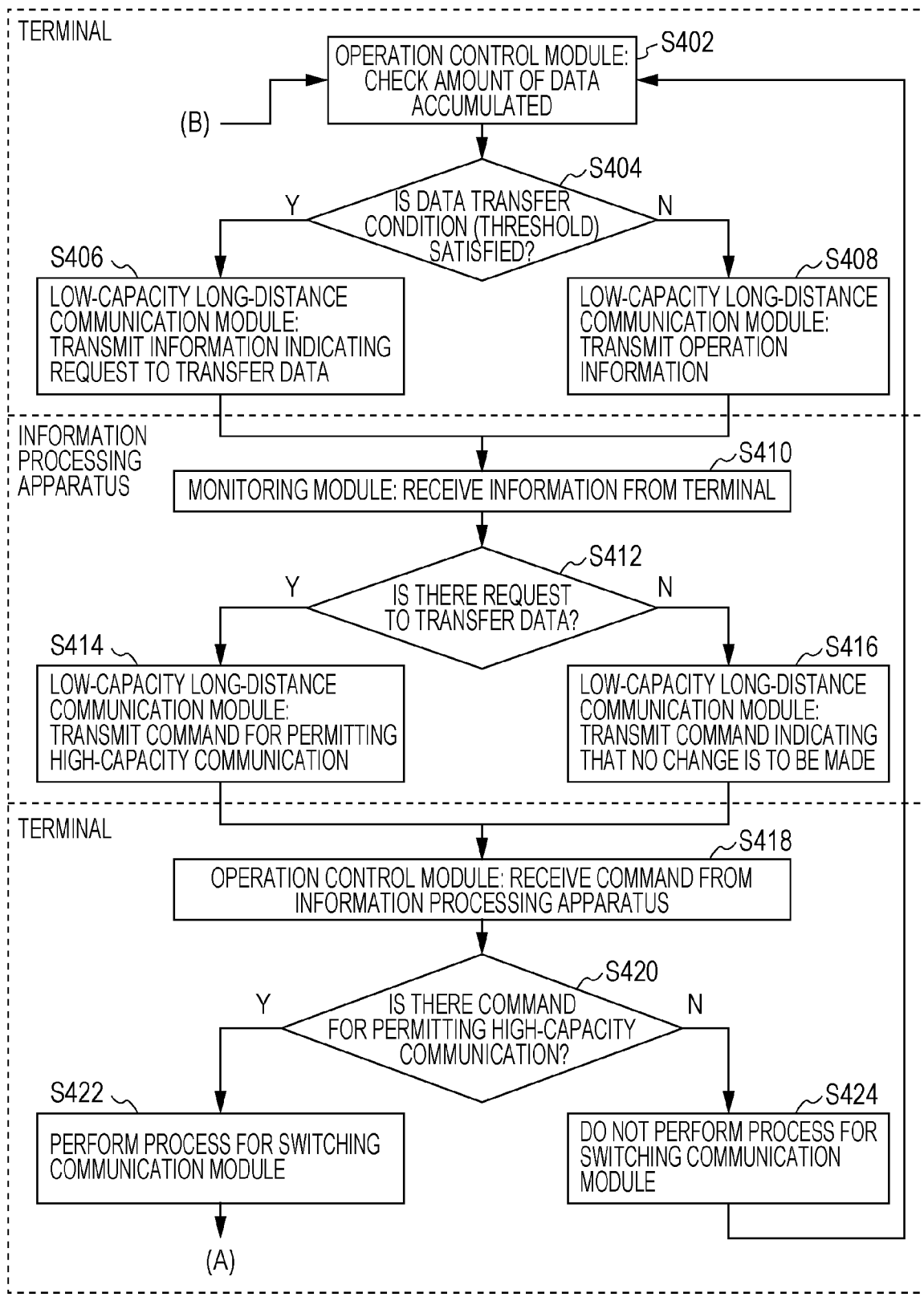

FIGS. 4A and 4B are flowcharts illustrating an example of a process according to the first exemplary embodiment.

Steps S402 to S408 are performed by the terminal 150.

In step S402, the operation control module 165 checks the amount of data accumulated in the accumulation module 175.

In step S404, the operation control module 165 determines whether a data transfer condition (threshold) is satisfied. If so, the process proceeds to step S406, and if not, the process proceeds to step S408.

In step S406, the low-capacity long-distance communication module 160 transmits, to the information processing apparatus 100, information indicating a request to transfer data (the request to transfer data is an example of a result of a determination indicating that the amount of data accumulated has exceeded the threshold).

In step S408, the low-capacity long-distance communication module 160 transmits operation information (more specifically, a result of measurement performed by the measuring module 170).

Steps S410 to S416 are performed by the information processing apparatus 100.

In step S410, the monitoring module 125 receives the information from the terminal 150.

In step S412, the monitoring module 125 determines whether there is a request to transfer data. If so, the process proceeds to step S414, and if not, the process proceeds to step S416.

In step S414, the low-capacity long-distance communication module 110 transmits a command for permitting high-capacity communication. The first wireless communication, which is achieved by the low-capacity long-distance communication module 110, then ends, and the second wireless communication, which is achieved by the high-capacity communication module 105, starts.

In step S416, the low-capacity long-distance communication module 110 transmits a command indicating that no change is to be made.

Steps S418 to S430 are performed by the terminal 150.

In step S418, the operation control module 165 receives the command from the information processing apparatus 100.

In step S420, the operation control module 165 determines whether there is a command for permitting high-capacity communication. If so, the process proceeds to step S422, and if not, the process proceeds to step S424.

In step S422, a process for switching a communication module is performed. More specifically, the first wireless communication, which is achieved by the low-capacity long-distance communication module 160, ends, and the second wireless communication, which is achieved by the high-capacity communication module 155, starts.

In step S424, the process returns to step S402 without performing the process for switching a communication module.

In step S426, the high-capacity communication module 155 starts a process for transferring data.

In step S428, the process for transferring data performed by the high-capacity communication module 155 ends. That is, the transfer of the data accumulated in the accumulation module 175 is completed.

In step S430, the low-capacity long-distance communication module 160 transmits, to the information processing apparatus 100, information indicating that the transfer of the data has been completed.

Steps S432 to S434 are performed by the information processing apparatus 100.

In step S432, the monitoring module 125 receives the information from the terminal 150.

In step S434, the low-capacity long-distance communication module 110 transmits, to the terminal 150, a command for stopping high-capacity communication. That is, the low-capacity long-distance communication module 110 transmits an instruction to resume a default communication method (wireless communication between the low-capacity long-distance communication module 160 and the information processing apparatus 100).

Steps S436 to S438 are performed by the terminal 150.

In step S436, the operation control module 165 receives the command from the information processing apparatus 100.

In step S438, the operation control module 165 performs a process for switching a communication module (more specifically, a process for switching from the high-capacity communication module 155 to the low-capacity long-distance communication module 160), and the process returns to step S402.

Second Exemplary Embodiment

Figure 5:
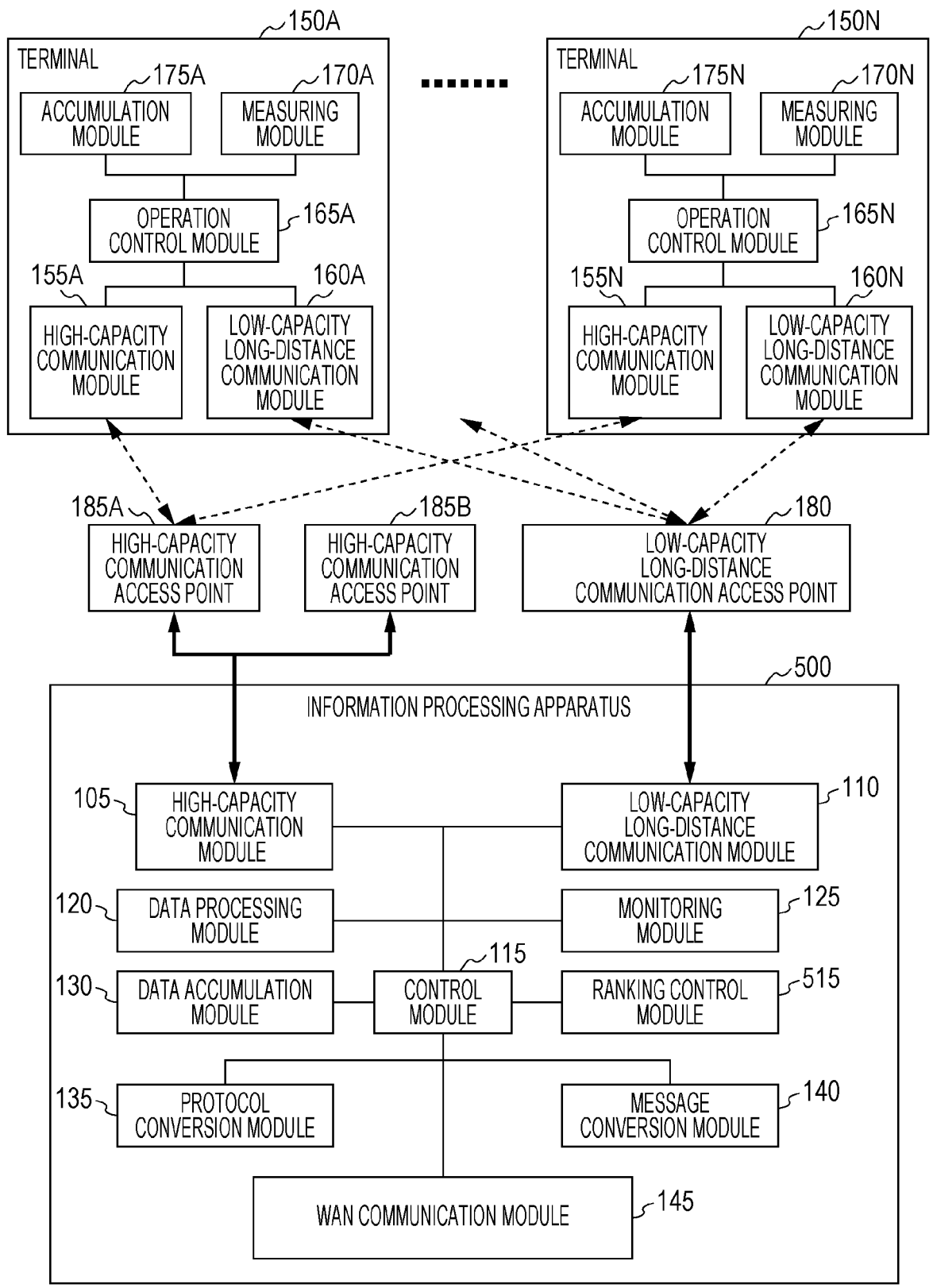
FIG. 5 is a conceptual diagram illustrating an example of the configuration of modules according to a second exemplary embodiment.

FIG. 5 is a conceptual diagram illustrating an example of the configuration of modules according to a second exemplary embodiment.

An information processing apparatus 500 wirelessly communicates with a plurality of terminals 150. As illustrated in FIG. 5, the information processing apparatus 500 includes the high-capacity communication module 105, the low-capacity long-distance communication module 110, the control module 115, the data processing module 120, the monitoring module 125, the data accumulation module 130, the protocol conversion module 135, the message conversion module 140, the WAN communication module 145, and a ranking control module 515. The information processing apparatus 500 has a function of a so-called "gateway apparatus". The information processing apparatus 500 is obtained by adding the ranking control module 515 to the information processing apparatus 100 according to the first exemplary embodiment. The wireless communication between the information processing apparatus 500 and the terminals 150 is performed through the low-capacity long-distance communication access point 180 or the high-capacity communication access point 185. When the low-capacity long-distance communication access point 180 is used, the first wireless communication is performed, and when the high-capacity communication access point 185 is used, the second wireless communication is performed.

The same components as in the first exemplary embodiment are given the same reference numerals, and redundant description thereof is omitted (the same holds in the following description).

The information processing apparatus 500 controls order in which the terminals 150 transmit data and also controls communication traffic.

The high-capacity communication module 105 is connected to the control module 115, the high-capacity communication access point 185A, and the high-capacity communication access point 185B.

The low-capacity long-distance communication module 110 is connected to the control module 115 and the low-capacity long-distance communication access point 180.

The control module 115 is connected to the high-capacity communication module 105, the low-capacity long-distance communication module 110, the data processing module 120, the monitoring module 125, the data accumulation module 130, the protocol conversion module 135, the message conversion module 140, the WAN communication module 145, and the ranking control module 515.

The data processing module 120 is connected to the control module 115.

The monitoring module 125 is connected to the control module 115.

The data accumulation module 130 is connected to the control module 115.

The protocol conversion module 135 is connected to the control module 115.

The message conversion module 140 is connected to the control module 115.

The WAN communication module 145 is connected to the control module 115.

The ranking control module 515 is connected to the control module 115. If the ranking control module 515 is notified from one of the plurality of terminals 150 that the amount of information accumulated in the terminal 150 is equal to or larger than a predetermined threshold, the ranking control module 515 ranks terminals 150 that perform the second wireless communication achieved by the high-capacity communication module 105. The ranking control module 515 may rank the terminals 150, for example, in order of a time at which a notification that the amount of information accumulated in a terminal 150 is equal to or larger than the predetermined threshold has been transmitted or received (year, month, date, hour, minute, second, sub-second, or a combination of these), in descending order of the amount of information accumulated in a terminal 150, or in descending order of a difference between the amount of information accumulated in a terminal 150 and the threshold.

The control module 115 controls the information processing apparatus 500 on the basis of rankings determined by the ranking control module 515 such that the information processing apparatus 500 wirelessly communicates with the terminals 150 using the high-capacity communication module 105.

If the control module 115 is notified from a plurality of terminals 150 that the amount of information accumulated in the terminals 150 is equal to or larger than the predetermined threshold, the control module 115 may switch from the low-capacity long-distance communication module 110 to the high-capacity communication module 105 in accordance with the rankings determined by the ranking control module 515 after the second wireless communication already performed with a terminal 150 using the high-capacity communication module 105 is completed.

A terminal 150A includes a high-capacity communication module 155A, a low-capacity long-distance communication module 160A, an operation control module 165A, a measuring module 170A, and an accumulation module 175.

The high-capacity communication module 155A is connected to the operation control module 165A and a high-capacity communication access point 185A.

The low-capacity long-distance communication module 160A is connected to the operation control module 165A and the low-capacity long-distance communication access point 180.

The operation control module 165A is connected to the high-capacity communication module 155A, the low-capacity long-distance communication module 160A, the measuring module 170A, and the accumulation module 175A.

The measuring module 170A is connected to the operation control module 165A.

The accumulation module 175A is connected to the operation control module 165A.

The other terminals 150 (e.g., a terminal 150N) have the same configuration as the terminal 150A.

The low-capacity long-distance communication access point 180 connects the low-capacity long-distance communication module 110 of the information processing apparatus 500, the low-capacity long-distance communication module 160A of the terminal 150A, and a low-capacity long-distance communication module 160N of the terminal 150N with one another through the first wireless communication.

The high-capacity communication access point 185A connects the high-capacity communication module 105 of the information processing apparatus 500, the high-capacity communication module 155A of the terminal 150A, and the high-capacity communication module 155N of the terminal 150N with one another through the second wireless communication.

As with the high-capacity communication access point 185A, other high-capacity communication access points 185 (e.g., a high-capacity communication access point 185B) connect the information processing apparatus 500 and the other terminals 150 with one another through the second wireless communication.

Figure 6B:
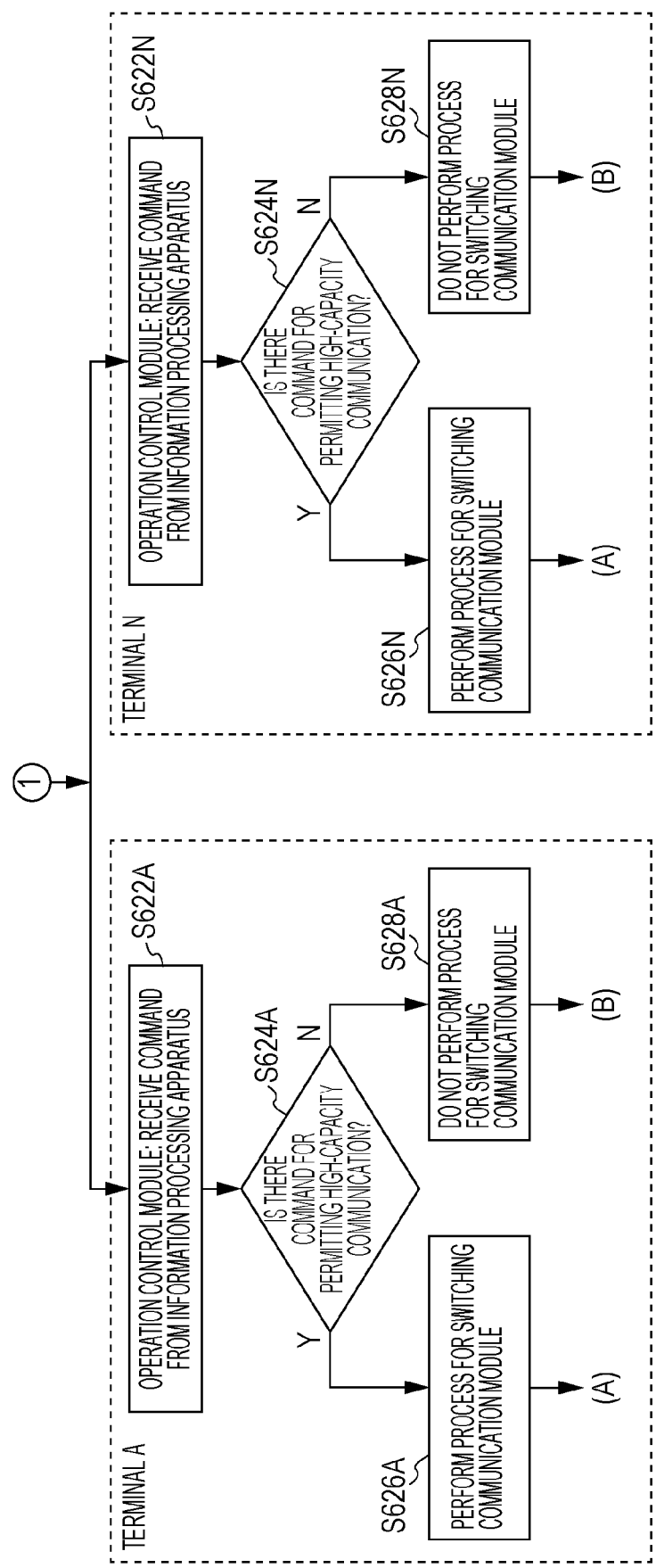

FIGS. 6A and 6B are flowcharts illustrating an example of a process according to the second exemplary embodiment. The flowcharts of FIGS. 6A and 6B are obtained by adding steps performed by the plurality of terminals 150, namely steps S614 and S616, to the flowcharts illustrated in FIGS. 4A and 4B. The process performed by each of the terminals 150 is the same.

Steps S602A to S608A are performed by the terminal 150A.

In step S602A, the operation control module 165A checks the amount of data accumulated.

In step S604A, the operation control module 165A determines whether a data transfer condition (threshold) is satisfied. If so, the process proceeds to step S606A, and if not, the process proceeds to step S608A.

In step S606A, the low-capacity long-distance communication module 160A transmits information indicating a request to transfer data.

In step S608A, the low-capacity long-distance communication module 160A transmits operation information.

Steps S602N to S608N are performed by the terminal 150N.

In step S602N, an operation control module 165N checks the amount of data accumulated.

In step S604N, the operation control module 165N determines whether a data transfer condition (threshold) is satisfied. If so, the process proceeds to step S606N, and if not, the process proceeds to step S608N.

In step S606N, the low-capacity long-distance communication module 160N transmits information indicating a request to transfer data.

In step S608N, the low-capacity long-distance communication module 160N transmits operation information.

Steps S610 to S620 are performed by the information processing apparatus 500.

In step S610, the monitoring module 125 receives information from a terminal 150.

In step S612, the monitoring module 125 determines whether there is a request to transfer data. If so, the process proceeds to step S614, and if not, the process proceeds to step S620.

In step S614, the ranking control module 515 accumulates commands for permitting high-capacity communication in order of a timestamp of reception of a request. That is, the ranking control module 515 makes rankings on the basis of times at which requests were received using a first-in first-out queue.

In step S616, the ranking control module 515 sequentially issues the accumulated commands after current transfer of data is completed.

In step S618, the low-capacity long-distance communication module 110 transmits a command for permitting high-capacity communication.

In step S620, the low-capacity long-distance communication module 110 transmits a command indicating that no change is to be made.

Steps S622A to S628A are performed by the terminal 150A.

In step S622A, the operation control module 165A receives the command from the information processing apparatus 500.

In step S624A, the operation control module 165A determines whether there is a command for permitting high-capacity communication. If so, the process proceeds to step S626A, and if not, the process proceeds to step S628A.

In step S626A, a process for switching a communication module is performed, and the process proceeds to step S426 in the flowchart of FIG. 4B.

In step S628A, the process returns to step S602A without performing the process for switching a communication module.

Steps S622N to S628N are performed by the terminal 150N.

In step S622N, the operation control module 165N receives the command from the information processing apparatus 500.

In step S624N, the operation control module 165N determines whether there is a command for permitting high-capacity communication. If so, the process proceeds to step S626N, and if not, the process proceeds to step S628N.

In step S626N, a process for switching a communication module is performed, and the process proceeds to step S426 in the flowchart of FIG. 4B.

In step S628N, the process returns to step S602N without performing the process for switching a communication module.

Third Exemplary Embodiment

Figure 7:
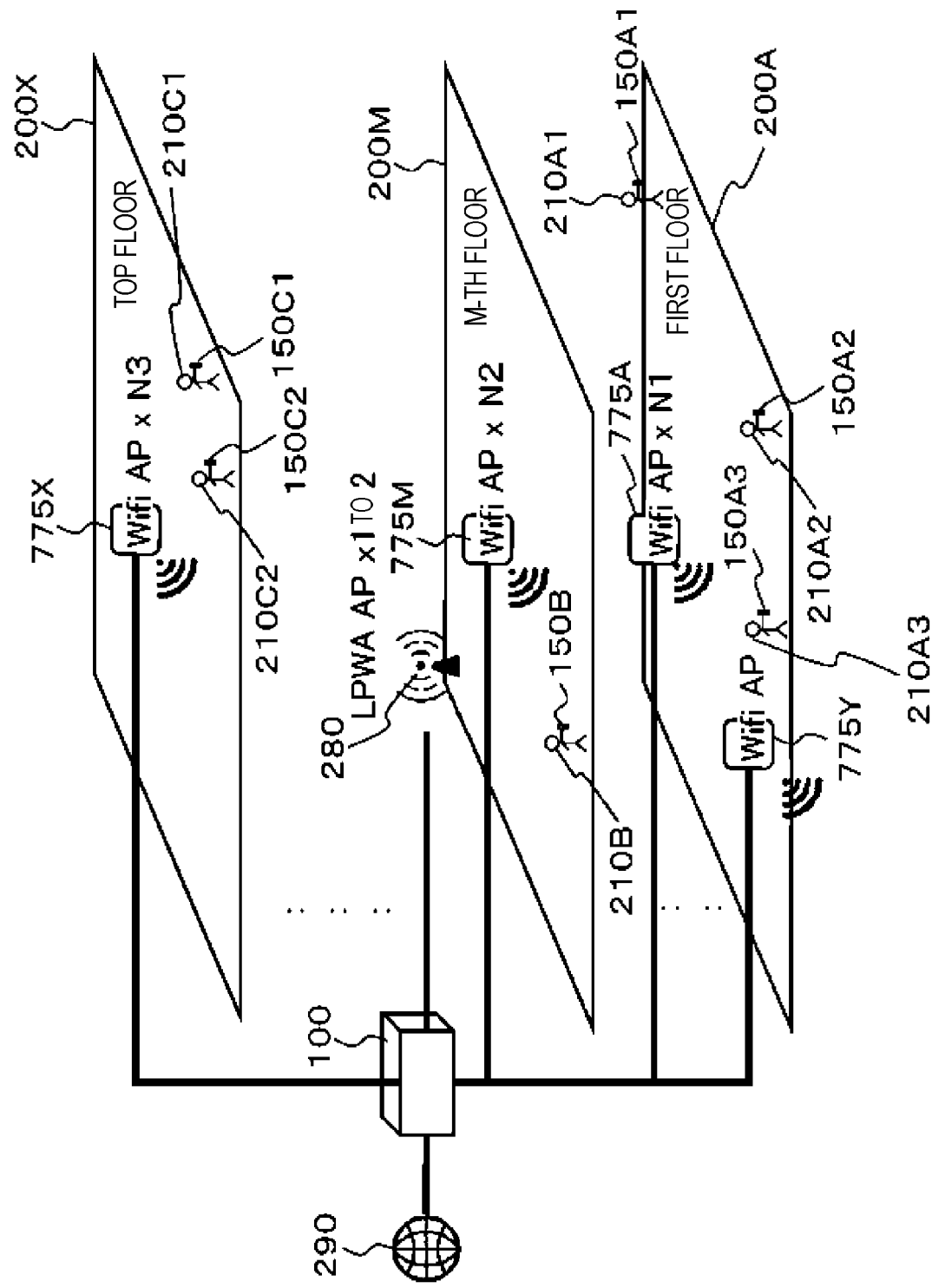
FIG. 7 is a diagram illustrating an example of a system configuration according to a third exemplary embodiment.

FIG. 7 is a diagram illustrating an example of a system configuration according to a third exemplary embodiment.

The example illustrated in FIG. 7 is equivalent to the example illustrated in FIG. 2, but in this case, a plurality of Wi-Fi access points 775 are provided on the first floor 200A. An identifier of a Wi-Fi access point 775Y is "abcd1234". The identifier of the Wi-Fi access point 775Y is, for example, a service set identifier (SSID). The Wi-Fi access point 775Y is provided for terminals 150. That is, the Wi-Fi access point 775Y is not used to transmit document information, numerical information regarding business management, and the like. The SSID of the Wi-Fi access point 775Y is stored in the information processing apparatus 100.

In the example illustrated in FIG. 7, a terminal 150A3 extracts the identifier of the Wi-Fi access point 775Y for the second wireless communication. When the terminal 150A3 has already been performing the second wireless communication, the terminal 150A3 can unconditionally communicate with the information processing apparatus 100 through the second wireless communication. More specifically, if the information processing apparatus 100 receives the identifier of the Wi-Fi access point 775Y from a terminal 150 and the identifier of the Wi-Fi access point 775Y matches an identifier stored in the information processing apparatus 100, the information processing apparatus 100 switches the communication with the terminal 150 from the first wireless communication to the second wireless communication, even if the information processing apparatus 100 has not been notified that the amount of information accumulated in the terminal 150 is equal to or larger than the predetermined threshold.

Figure 8:
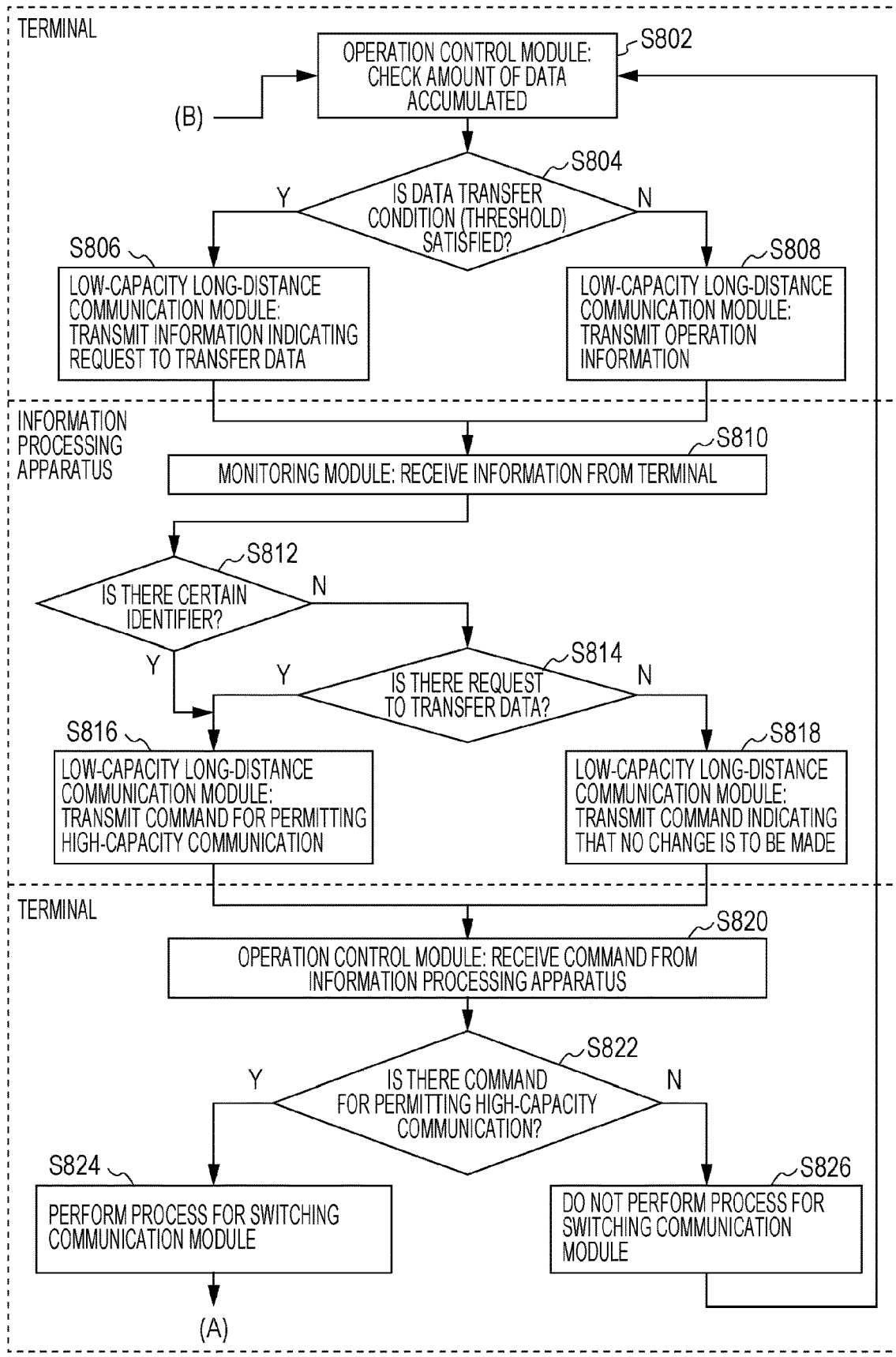
FIG. 8 is a flowchart illustrating an example of a process according to the third exemplary embodiment.

FIG. 8 is a flowchart illustrating an example of a process according to the third exemplary embodiment.

The module configuration according to the first or second exemplary embodiment may be employed.

The flowchart of FIG. 8 is obtained by changing step S408 in the flowchart of FIG. 4A to step S808 and adding step S812. Alternatively, in the flowchart of FIG. 6A, step S608, which is performed by the at least one terminal 150, may be changed to step S808, and step S812 may be added after step S610. If a result of step S812 is Y, the process may proceed to step S614, and if the result of step S812 is N, the process may proceed to step S612.

If the control module 115 receives, from a terminal 150, information for identifying the high-capacity communication access point 185 or a Wi-Fi access point 775, the control module 115 switches from the low-capacity long-distance communication module 110 to the high-capacity communication module 105.

Even if the control module 115 has not been notified from a terminal 150 that the amount of information accumulated in the terminal 150 is equal to or larger than the predetermined threshold, the control module 115 may switch from the low-capacity long-distance communication module 110 to the high-capacity communication module 105, if the control module 115 receives information for identifying the high-capacity communication access point 185 or a Wi-Fi access point 775.

Steps S802 to S808 are performed by a terminal 150.

In step S802, the operation control module 165 checks the amount of data accumulated.

In step S804, the operation control module 165 determines whether a data transfer condition (threshold) is satisfied. If so, the process proceeds to step S806, and if not, the process proceeds to step S808.

In step S806, the low-capacity long-distance communication module 160 transmits information indicating a request to transfer data.

In step S808, the low-capacity long-distance communication module 160 transmits operation information and an identifier of an access point for high-capacity communication. Although a result of step S804 has been N, the terminal 150 has already obtained the identifier of the Wi-Fi access point 775, that is, the terminal 150 can perform the second wireless communication or has already been performing the second wireless communication.

Steps S810 to S818 are performed by the information processing apparatus 100.

In step S810, the monitoring module 125 receives the information from the terminal 150.

In step S812, the monitoring module 125 determines whether there is a certain identifier in the information received from the terminal 150. If so, the process proceeds to step S816, and if not, the process proceeds to step S814. The certain identifier is an identifier of a Wi-Fi access point 775 stored in the information processing apparatus 100 and registered as an identifier of a Wi-Fi access point 775 dedicated to communication with the terminal 150.

Alternatively, in step S812, the monitoring module 125 may determine whether there is an identifier of a Wi-Fi access point 775 in the information received from the terminal 150. If so, the process may proceed to step S816, and if not, the process may proceed to step S814.

In step S814, the monitoring module 125 determines whether there is a request to transfer data. If so, the process proceeds to step S816, and if not, the process proceeds to step S818.

In step S816, the low-capacity long-distance communication module 110 transmits a command for permitting high-capacity communication. If the result of step S812 is Y, or if the result of step S812 is N but a result of step S814 is Y, step S816 is performed. That is, if the result of step S812 is Y, the determination need not be made in step S814.

In step S818, the low-capacity long-distance communication module 110 transmits a command indicating that no change is to be made.

Steps S820 to S826 are performed by the terminal 150.

In step S820, the operation control module 165 receives the command from the information processing apparatus 100.

In step S822, the operation control module 165 determines whether there is a command for permitting high-capacity communication. If so, the process proceeds to step S824, and if not, the process proceeds to step S826.

In step S824, a process for switching a communication module is performed, and the process proceeds to step S426 in the flowchart of FIG. 4B.

In step S826, the process returns to step S802 without performing the process for switching a communication module.

Figure 9:
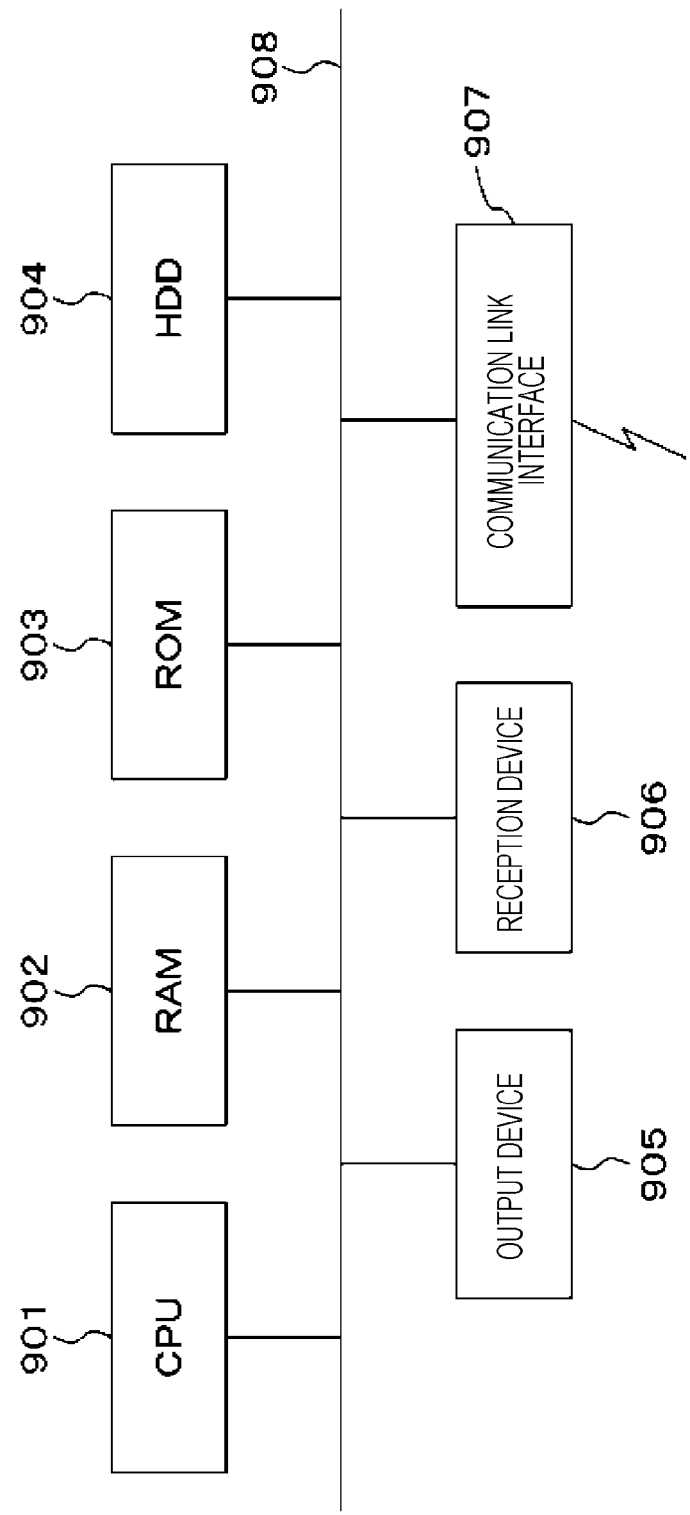
FIG. 9 is a block diagram illustrating an example of the hardware configuration of a computer that achieves the exemplary embodiments.

As illustrated in FIG. 9, the hardware configuration of a computer that executes a program according to any of the above exemplary embodiments is that of a general-purpose computer, that is, the computer may be a personal computer, a computer that can serve as a server, or the like. In a specific example, a CPU 901 is used as a processing unit (arithmetic unit), and a RAM 902, a read-only memory (ROM) 903, and a hard disk drive (HDD) 904 are used as storage devices. The HDD 904 may be a solid-state drive (SSD), which is a flash memory, instead. The computer includes the CPU 901, which executes a program corresponding to the high-capacity communication module 105, the low-capacity long-distance communication module 110, the control module 115, the data processing module 120, the monitoring module 125, the protocol conversion module 135, the message conversion module 140, the WAN communication module 145, the high-capacity communication module 155, the low-capacity long-distance communication module 160, the operation control module 165, the measuring module 170, the ranking control module 515, and the like, the RAM 902 storing the program and data, the ROM 903 storing a program for activating the computer and the like, the HDD 904, which is an auxiliary storage device, having functions of the data accumulation module 130, the accumulation module 175, and the like, a reception device 906 that receives data on the basis of operations (include motion, sound, gaze, etc.) performed by a user on a keyboard, a mouse, a touch screen, a microphone, a camera (may be a gaze detection camera or the like), and/or the like, an output device 905 such as a liquid crystal display, an organic electroluminescent (EL) display, or a speaker, a communication link interface 907, such as a network interface card, for connecting to a communication network, and a bus 908 that connects the above components to one another for communication of data. A plurality of such computers may be connected to one another through a network.

When a computer program is used to implement any of the above exemplary embodiments, a system having the above hardware configuration reads a computer program, which is software, and the software and hardware resources operate together to achieve the exemplary embodiment.

The hardware configuration illustrated in FIG. 9 is an example, and the above exemplary embodiments are not limited to the configuration illustrated in FIG. 9. Any configuration capable of achieving the modules described in any of the above exemplary embodiments may be used. For example, some modules may be achieved by dedicated hardware (e.g., an application-specific integrated circuit (ASIC)) or a reconfigurable integrated circuit (more specifically, a field-programmable gate array (FPGA), etc.), and other modules may be provided in an external system and connected through a communication link. Furthermore, the system illustrated in FIG. 9 may be one of identical systems connected to one another through a communication link and operate together. In addition, the hardware configuration illustrated in FIG. 9 may be incorporated into a personal computer, a mobile information communication device (a mobile phone, a smartphone, a mobile device, a wearable computer, etc.), an information home appliance, a robot, a copier, a fax machine, a scanner, a printer, a multifunction peripheral (an image processing apparatus having two or more of functions of a scanner, a printer, a copier, a fax machine, and the like).

The program may be stored in a storage medium and provided or may be provided through communication means. In these cases, the above exemplary embodiments may be achieved by a computer readable medium storing the program.

The "computer readable medium storing the program" refers to a computer readable medium storing the program used to install, execute, and distribute the program.

The computer readable medium may be, for example, a digital versatile disc-recordable (DVD-R), a DVD-rewritable (RW), a DVD-RAM, or the like developed by the DVD Forum, a DVD+R, a DVD+RW, or the like developed by the DVD+RW Alliance, a compact disc (CD)-ROM, a CD-R, a CD-RW, a Blu-ray disc (BD; registered trademark), a magneto-optical (MO) disk, a flexible disk (FD), a magnetic tape, a hard disk, a ROM, an electrically erasable programmable read-only memory (EEPROM), a flash memory, a RAM, a secure digital (SD) memory card, or the like.

A part or the entirety of the program may be stored in the medium and saved or distributed. The program may be transmitted through a communication medium, such as a wired network, a wireless network, or a combination of these networks, used for a local area network (LAN), a metropolitan area network (MAN), a WAN, the Internet, an intranet, an extranet, or the like. Alternatively, the program may be transmitted through carrier waves.

Furthermore, the program may be a part or the entirety of another program or may be stored in a storage medium along with another program. The program may be divided and stored in a plurality of storage media. The stored program may be compressed, encoded, or in any other form, insofar as the program can be restored.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a first communication unit that performs first wireless communication, which is long-distance wireless communication with a terminal;
    a second communication unit that performs second wireless communication, which is short-distance wireless communication with the terminal; and
    a control unit configured to receive from the terminal an amount of information accumulated in the terminal, and the control unit switches from the first communication unit to the second communication unit as the amount of information has reached or has exceeded a predetermined threshold,
    wherein the information processing apparatus wirelessly communicates with a plurality of terminals, and
    wherein, the control unit is configured to receive from each of the plurality of terminals an amount of information accumulated in each of the plurality of terminals, and the control unit ranks, in order of a time at which a notification that the amount of information accumulated in the terminal is equal to or larger than the predetermined threshold has been transmitted or received, terminals that perform the second wireless communication achieved by the second communication unit as the amount of information accumulated in one of the plurality of terminals has reached or has exceeded the predetermined threshold.

2. The information processing apparatus according to claim 1,
    wherein, in the second wireless communication, communication capacity is higher than in the first wireless communication.

3. The information processing apparatus according to claim 2,
    wherein, in the first wireless communication, power consumption is lower than in the second wireless communication.

4. The information processing apparatus according to claim 1,
    wherein the control unit transmits, to the terminal, an instruction to switch from the first wireless communication to the second wireless communication.

5. The information processing apparatus according to claim 4,
    wherein, the control unit configured to receive from the terminal transmission of the information accumulated in the terminal has been completed, and the control unit switches from the second communication unit to the first communication unit.

6. The information processing apparatus according to claim 5,
    wherein the control unit transmits, to the terminal, an instruction to switch from the second wireless communication to the first wireless communication.

7. The information processing apparatus according to claim 1,
    wherein, the control unit, as the amount of information accumulated in the one of the plurality of terminals has reached or has exceeded the predetermined threshold, switches from the first communication unit to the second communication unit in accordance with a result of ranking after completing the second wireless communication that has already been performed with one of the plurality of terminals using the second communication unit.

8. The information processing apparatus according to claim 1,
wherein, the control unit is configured to receive, from the terminal, information for identifying a device that relays the second wireless communication, the control unit switches from the first communication unit to the second communication unit.

9. The information processing apparatus according to claim 8,
wherein, even if the control unit has not been notified from the terminal that the amount of information accumulated in the terminal is equal to or larger than the predetermined threshold, the control unit switches from the first communication unit to the second communication unit.

10. A non-transitory computer readable medium storing a program causing a computer to execute a process for processing information, the process comprising:
performing first wireless communication, which is long-distance wireless communication with a terminal;
performing second wireless communication, which is short-distance wireless communication with the terminal; and
receiving from the terminal an amount of information accumulated in the terminal and switching from the first wireless communication to the second wireless communication as the amount of information has reached or has exceeded a predetermined threshold,
the process further comprises:
wirelessly communicating with a plurality of terminals;
receiving from each of the plurality of terminals an amount of information accumulated in each of the plurality of terminals; and
ranking, in order of a time at which a notification that the amount of information accumulated in the terminal is equal to or larger than the predetermined threshold has been transmitted or received, terminals that perform the second wireless communication as the amount of information accumulated in one of the plurality of terminals has reached or has exceeded the predetermined threshold.

11. An information processing apparatus comprising:
first communication means for performing first wireless communication, which is long-distance wireless communication with a terminal;
second communication means for performing second wireless communication, which is short-distance wireless communication with the terminal; and
control means for receiving from the terminal an amount of information accumulated in the terminal and switching from the first communication means to the second communication means as the amount of information has reached or has exceeded a predetermined threshold,
wherein the information processing apparatus wirelessly communicates with a plurality of terminals, and
wherein, the control means is configured to receive from each of the plurality of terminals an amount of information accumulated in each of the plurality of terminals, and the control means ranks, in order of a time at which a notification that the amount of information accumulated in the terminal is equal to or larger than the predetermined threshold has been transmitted or received, terminals that perform the second wireless communication achieved by the second communication means as the amount of information accumulated in one of the plurality of terminals has reached or has exceeded the predetermined threshold.

* * * * *